UNITED STATES PATENT OFFICE.

HARMON HIBBARD, OF ATTICA, NEW YORK.

IMPROVEMENT IN THE PROCESS OF COLORING HATS, FURS, &c.

Specification forming part of Letters Patent No. 746, dated May 25, 1838.

*To all whom it may concern:*

Be it known that I, HARMON HIBBARD, of Attica, in the county of Genesee and State of New York, have invented a new and Improved Mode of Preparing Compounds to be used in Dyeing; and I hereby declare that the following is a full and exact description.

To enable others skilled in the art to prepare and use my compositions, I will proceed to describe the methods in full.

I prepare a mordant by putting into a large earthen pot one quart of nitric acid with one quart of good vinegar. I then add three cents of copper, and scraps of tinned iron from the tin-shops sufficient to saturate the acids completely, and when the action ceases I add to it one quart of vinegar with agitation, then bottle it for use. In dyeing hats I allow about one-half a gill of this preparation for each hat, but in dyeing cloth or yarn I allow about one-half gill to a pound of goods. I apply it to hats by putting it into a dye-kettle with a suitable quantity of water for the number of hats to be dyed. I then put in the hats and cause them to be boiled forty minutes, while at the same time I allow for each hat about six ounces of logwood-chips or their extract, and the same quantity of ground Cicily sumac, which I put into a suitable bag and immerse in a separate kettle of water, when I cause them to be boiled until I get all their extract. I then lift the hats from the dye-kettle and pour the extract contained in the small kettle into the dye-kettle, and at the same time I put in pearlash or saleratus, allowing one pound to thirty gallons of the dye, and then stir the dye until the alkali is dissolved. I then immerse the hats in it and cause them to be boiled two hours, at which time they will commonly emit a good black and gloss, if clean. But to color furs on the pelt I omit the alkali in the dye, and prepare them, after being tanned, in sumac liquor by brushing onto the fur side a preparation that is made by boiling in the proportion of one pound of quicklime, four ounces of red lead in one gallon of water until one-half is evaporated. I let this remain on about one hour and then wash it off, but before the fur is dry I wash it over again with the mordant acids. Then after the fur gets dry I brush it over with the above dye, after boiling it down to about double the strength of that used on hats. I apply the lime, mordant, and dye when hot, and let the dye be repeated and remain on until the fur is dark enough. The nitrate of iron may be used as a mordant for goods to be dyed black, but it makes the goods feel harsh and appear dusty. I use the composition of nitric acid and vinegar with iron, copper, and tin, as it will not injure the goods, like the sulphates of these metals, which is the principal cause of the damage frequently sustained in dyeing blacks; but where the above composition is used the goods not only feel soft, but retain a gloss. I use the alkali to discharge the animal oil, if contained in the goods, to dissolve the resinous part of the coloring-matter and destroy the acid, and where this mordant and dye are used fur, hats, woolen, cotton, and linen goods may be boiled with impunity, which boiling does greatly facilitate the process of dyeing.

What I claim as my invention, and desire to secure by Letters Patent, is—

The using a fixed alkali in the composition of a dye in the manner above described, likewise the mixing of nitric and acetic acids, and dissolving metals in the manner and proportions above described, to be used as a mordant, as set forth.

HARMON HIBBARD.

Witnesses:
MOSES CALCORD,
ABEL WILDER.